United States Patent
Yazdanbod

(10) Patent No.: US 9,586,841 B2
(45) Date of Patent: Mar. 7, 2017

(54) PROCESS AND APPARATUS FOR OSMOTIC FLOW CONTROL IN ELECTRODIALYSIS SYSTEMS

(71) Applicant: Azaroghly Yazdanbod, Calgary (CA)

(72) Inventor: Azaroghly Yazdanbod, Calgary (CA)

(73) Assignee: IONIC SOLUTIONS LTD., Rancho Mirage, CA (US)

( * ) Notice: Subject to any disclaimer, the term of this patent is extended or adjusted under 35 U.S.C. 154(b) by 0 days.

(21) Appl. No.: 14/314,330

(22) Filed: Jun. 25, 2014

(65) Prior Publication Data

US 2014/0374256 A1    Dec. 25, 2014

Related U.S. Application Data

(60) Provisional application No. 61/838,983, filed on Jun. 25, 2013.

(51) Int. Cl.
    *B01D 61/44*        (2006.01)
    *C02F 1/469*        (2006.01)
    *B01D 61/42*        (2006.01)

(52) U.S. Cl.
    CPC .......... *C02F 1/4693* (2013.01); *B01D 61/422* (2013.01); *B01D 61/44* (2013.01); *B01D 2313/14* (2013.01); *B01D 2313/24* (2013.01)

(58) Field of Classification Search
    CPC ...... C02F 1/4695; C02F 1/4693; B01D 61/44; B01D 61/422; B01D 2313/14; B01D 2313/24
    USPC .......................... 205/523, 633; 204/523, 633
    See application file for complete search history.

(56) References Cited

U.S. PATENT DOCUMENTS

| | | | |
|---|---|---|---|
| 3,657,105 A | 4/1972 | Veld | |
| 3,697,410 A * | 10/1972 | Johnson et al. | 204/633 |
| 3,878,086 A * | 4/1975 | Haswell et al. | 204/635 |
| 3,893,901 A * | 7/1975 | Tejeda | B01D 61/48 |
| | | | 204/632 |
| 5,447,610 A | 9/1995 | Sharifian | |
| 5,514,103 A | 5/1996 | Srisathapat et al. | |
| 6,436,264 B1 | 8/2002 | Tamura | |
| 8,101,058 B2 | 1/2012 | Liang et al. | |
| 2011/0042219 A1 | 2/2011 | Wei et al. | |
| 2012/0152747 A1* | 6/2012 | Eisaman | B01D 53/1425 |
| | | | 204/631 |

FOREIGN PATENT DOCUMENTS

| WO | WO 00/25903 | * 5/2000 |
|---|---|---|
| WO | WO 00/25903 | 11/2000 |

* cited by examiner

*Primary Examiner* — Arun S Phasge
(74) *Attorney, Agent, or Firm* — Hasse & Nesbitt LLC; Ronald J. Richter

(57) ABSTRACT

An electrodialysis process and apparatus is presented for improving the current efficiency of salty water desalination. The process includes reducing the osmotic and the electro-osmotic flow of water from diluate compartments to concentrate compartments, and between electrode compartments and adjacent compartments, by confinement and hydraulic isolation of their contents in constant volume compartments, so that the tendency of waters entering from diluate compartments to concentrate compartments leads to pressure buildup in the concentrate compartments, reducing the transfer of product desalinated water to the concentrate waste.

15 Claims, 7 Drawing Sheets

PROCESS AND APPARATUS FOR OSMOTIC FLOW CONTROL IN ELECTRODIALYSIS SYSTEMS

CROSS REFERENCE TO RELATED APPLICATION

This application claims the benefit of U.S. Provisional Application No. 61/838,983, filed Jun. 25, 2013, which is incorporated herein in its entirety.

FIELD OF THE INVENTION

The present invention generally relates to a process and apparatus for improving the current efficiency of electrodialysis processes and equipment for desalination of salty waters by pressurizing the liquid contents of concentrate compartments, and more particularly to an apparatus and process for reducing and/or eliminating the loss of diluted product outputs to concentrate waste by confinement and hydraulic isolation of the solution in the concentrate compartments so that the tendency of water to enter the concentrate compartments from adjacent diluate compartments leads to pressure buildup, resulting in prevention of osmotic and electro-osmotic flow of diluted water into them.

BACKGROUND OF THE INVENTION

Devices employed for removing dissolved ions from liquid using electrical fields include electrodialysis and electrodeionization devices used for such purposes as desalination of saltwater and removal of ionic contaminants from base solutions. A typical electrodialysis cell consists of a series of diluate compartments and a concentrate compartments sequentially formed between anion exchange membranes and cation exchange membranes placed between two electrodes. In almost all practical electrodialysis processes, multiple electrodialysis paired compartments made of alternating anion and cation exchange membranes are arranged into a configuration called an electrodialysis stack. Thus, an "electrodialysis cell" generally includes the combination of an electrodialysis stack, a pair of electrodes, and input and output fluid flow channels/passages. In such devices, these stacks are placed in the path of ions moving under the influence of an electric field, resulting in formation of alternating diluate and concentrate compartments. Ions are depleted from the diluate compartments and accumulated in the concentrate compartments, as is known it the art. In addition, specific spacers are typically incorporated in various forms between adjacent ion exchange membranes. This is done in order to facilitate the independent flow of the liquids in the diluate and concentrate compartments, as well as to create volume within each compartment, prevent leakage from the stack to the outside, and to maintain separation between adjacent anion and cation exchange membranes. Typically, input solutions are directed through specific flow channels positioned in the supporting endplates of the device, which in combination with flow passages in the spacers and membranes, enable the independent flows in the concentrate and diluate compartments.

Electrodeionization devices are generally distinguished from electrodialysis devices in that the space in the center of the cell, between the ion-selective membranes, is filled with a thin bed of ion-exchange resins in the diluate compartment, or in both the diluate and concentrate compartments. Electrodeionization devices are typically used for production of higher purity products. The membranes are separated from one another by a screen separator, and the ion exchange resins facilitate ion flow in the sparingly conductive high purity deionized products. While technically different, as used herein the terms "electrodialysis" and "electrodeionization" can be used interchangeably, unless otherwise stated.

The most common electrodialysis equipment uses conventional metallic electrodes and establishes an electric field through electrode reactions with the solutions placed adjacent to them. The electrodes used can also be of the capacitive type, which are capable of absorbing large amount of ions and capacitively establishing the electric field. U.S. Pat. No. 8,715,477 to Yazdanbod (the inventor of the present invention), which is incorporated herein by reference in its entirety, specifically teaches electric double layer capacitors, behavior of high electric capacity electrodes in confined containers, use of high electric capacity electrodes as means of capacitive generation of electric fields, and polarity reversals as means of avoiding electrode reactions. Experimental evidence and test results establishing the formation, voltage distribution, and operating conditions of Electric Double Layer Capacitors (EDLCs) is an important feature incorporated in the present invention.

Although the primary goal in using electrodialysis devices is to move the dissolved ions from the diluate compartments to the concentrate compartments, typically some water movement also occurs, thus reducing the volume of the desired product (which is the purified liquid in the diluate compartment). This reduces the efficiency of such devices in producing purified liquids, such as desalinated or deionized water. Movement of water molecules from the diluate compartments to the concentrate compartments mainly occurs by three processes: (1) movement of water molecules attached to individual ions as hydration water; (2) movement of water from within the pore structure of the ion exchange membranes by electro-osmosis; and (3) water movement by osmosis. In electrodialysis equipment, all of these water transfer processes occur simultaneously through the membranes defining the boundaries of the compartments.

First, as ions moving in such liquids are hydrated ions in which a number of water molecules are attached to individual ions, the movement of these ions from the diluate compartments to concentrate compartments also results in the transfer of these attached water molecules. This mode of transfer of water is considered to be minor.

Second, since anion exchange membranes are positively charged, allowing for attachment and passage of negatively charged anions through their fine porous structures (which are filled with water and hydrated ions), induced movement of anions by the electric field also results in dragging of some of the water molecules from within the membrane pores. This coupled flow of water with ions under the influence of an electric field is defined as electro-osmosis. The same phenomenon occurs in negatively charged cation exchange membranes, which allow the passage of positively charged cations along with water through their pore structure. This phenomenon can be seen in electrodialysis experiments, in which water flow into the concentrate compartments and out of the diluate compartments is observed when the exit lines of both these compartments are closed and entry lines are monitored by such means as observing water level changes in input lines that were at the same level before application of the electric field. The rate of electro-osmotic flow can be mathematically described through the equation: $Qe = Ke * E * A$, where the flow, "$Qe$", in $m^3/sec$ is governed by coefficient of electro-osmotic conductivity "$Ke$" in $m^2/volt*sec$ of the membrane, voltage gradient across the membrane "E" in volt/m and the area of the membrane "A" in m². As a result, the amount of electro-osmotic flow per unit area is governed by coefficient of electro-osmotic conductivity which is a function of the type and structure of the membrane under consideration as well as solution concentration and the voltage gradient. For a given membrane, the higher the voltage step used across the membrane, the higher the electro-osmotic flow rate per unit area will be. Electro-osmotic flow could be reduced or stopped by applying a hydrostatic pressure to the other side of the membrane. The amount of pressure required is a function of the structure of the membrane as well as solution concentration, voltage gradient and coefficient of electro-osmotic conductivity.

The third mode of water movement in electrodialysis devices is through the process of osmosis. As the water in the diluate compartment becomes more dilute and as the water in the concentrate compartment becomes more concentrated, the concentration difference between the two leads to mobilization of osmotic pressure causing the flow of water from the diluate side to the concentrate side, while the larger ions are blocked. This process is independent of the electric field moving the ions. Osmotic pressure can be viewed as a compressive pressure imposed on the diluate side of the membrane to push the water molecules from the diluate side into the concentrate side. This convention of defining the direction of the osmotic pressure is used in this document. Osmotic pressure, which is governed by the ratio of solute particles to solvent particles in a solution, can be calculated for each solution using the Van't Hoff formula: $\pi=cRT$, in which osmotic pressure $\pi$ is in Bars (kg/cm²), c is molar concentration of the solute in mol/liter, R is the gas constant equal to 0.082 (liter*Bar)/(degree*mol) and T is the temperature in degrees Kelvin. The difference in the osmotic pressure calculated for the dilute and the concentrated solutions is the osmotic pressure imposed on the membrane from the diluate side towards the concentrate side of the membrane. This pressure results in flow of water through the membrane, which can be stopped if the hydrostatic pressure on the concentrate side equals it. Indeed, if the pressure applied to the semi-permeable membrane between the two solutions, from the concentrate side, exceeds the osmotic pressure imposed on the membrane from the diluate side, then pure water will flow from the concentrate side to the diluate side. This is called reverse osmosis and is often used as a desalination technique.

The osmotic flow through a semi-permeable membrane can be calculated using Darcy's law $Qh=Kh*I*A$ in which "Qh" is the hydraulic flow in m³/sec, "Kb" is the hydraulic conductivity of the semi-permeable membrane, "I" is hydraulic gradient in m/m (which is the hydraulic head created by osmosis divided by membrane thickness), and "A" is the membrane area in m². This process is different from diffusion, which is defined as spreading of particles, and more specifically where there is either no membrane between mixing substances or the membrane between the two liquids has high conductivity for water as well as the dissolved ions. Although a theoretical discussion is not presented, it is noted that ion selective membranes used in electrodialysis equipment are semi-permeable membranes, allowing for osmosis and preventing diffusion. Passage of ions through ion selective membranes is only possible under the influence of an electric field or under pressure, provided electro-neutrality is maintained. That is, if a certain amount of charge is transferred from one liquid compartment to another through an ion selective membrane, there must be some means of neutralizing the remaining solution such as removing an equal amount of oppositely charged ions. Otherwise the resulting voltage buildup will prevent any further movement of ions.

Current efficiency is a measure of how effectively ions are transported across the ion exchange membranes for a given applied current. This means that when a given current "I" in Amperes passes through a diluate compartment for a given time "t" in seconds, the current efficiency could be defined as the ratio I*t to the charge transferred from the output diluate volume to the concentrate. As an example, if a current of 1.0 Amperes passes for period on 100 seconds between the electrodes of an electrodialysis cell, and if during the same period an equivalent of 80 Coulombs of charge is transferred from a diluate compartment to the two adjacent concentrate compartments, then the current efficiency is 80%. Typically current efficiencies of >80% are desirable in commercial electrodialysis operations to minimize energy operating costs. Low current efficiencies can be an indicator of water splitting in the diluate or concentrate streams, shunt currents between the electrodes, the occurrence of back-diffusion of ions from the concentrate to the diluate, or (as has been observed by this inventor) it could be caused by osmotic flow of diluate into the concentrate that reduces the output diluate volume. In typical electrodialysis devices, the speed by which the diluate flow is drawn from the diluate compartment can be increased in order to reduce the total osmotic flow. This requires faster removal of ions from the diluate compartment so that the desired product is formed faster and is also drawn out faster before much of it moves to the concentrate compartments. Within practical limits set by applicable voltages, currents and other limitations, the use of higher voltages to achieve faster desalination of the diluate and faster removal of the product is recognized as a method of improving the current efficiency.

Further optimization of current efficiency can also be achieved by control of the concentration of the solution in the concentrate compartments, by increasing the flow speed into these compartments, or by rapid displacement of these solutions through faster inflow of the input solutions to these compartments. That is, to limit osmotic flow between the diluate and the concentrate compartments, the process rate is increased by effecting faster ion transfer between compartments and higher fluid flow rates in the compartments. Since the rate of ion removal for a given concentration of inputs and outputs (the concentrate reject and the diluted solutions) is governed by Ohm's law and is therefore proportional to the intensity of the electric field (which is a function of the applied voltage between the electrodes), and since the amount of energy used to transfer a given amount of ions between compartments is also proportional to the voltage step applied to each compartment between the electrodes, the faster rate of production in these devices is achieved at the cost of higher energy use. As a result, there is a need to reduce the energy consumption per unit volume production in such devices by reducing the transfer rate of product water from the diluate to concentrate compartments.

Available literature regarding the current efficiency of electrodialysis equipment typically does not relate improved current efficiency to the application of pressure to the diluate/concentrate compartments. Rather, discussions range from claims that current efficiency is a function of feed concentration, to viewing current efficiency as a phenomenon affected by water splitting, deficient membrane ion selectivity, water transfer by osmosis/ion hydration, shunt currents, and back diffusion of ions from the concentrate to the diluate compartment. U.S. Patent App. Pub. No. 2011/

0042219 to Wie et al., discloses the application of differential pressure to the electrodialysis unit input lines "to ensure minimal back diffusion" (paragraph [0025]), but it is not disclosed what this means exactly, and which line should be higher or lower in pressure or what pressures are needed. Further, many manufacturers recommend so-called zero trans-membrane pressure levels, which means that the hydrostatic pressure on both sides of these membranes are recommended to be the same. This is specified to prevent damage and puncture of the membranes. As such, other membrane manufacturers specify a maximum allowable pressure to prevent bursting of their membranes. U.S. Pat. No. 8,101,058 to Liang et al. discloses the use of a "pressure vessel" for raising the internal pressure of the device, but notes only that this can reduce the pressure difference between the interior and the exterior of the device, which can reduce manufacturing costs or simplify construction.

While the above-mentioned electrodialysis methods and devices may be useful for their intended purposes, there currently is no device or method for improving the current efficiency of electrodialysis systems by pressurizing the concentrate compartment as compared to the diluate compartment. It would thus be beneficial to provide a desalination device that can improve current efficiency in this manner. It would also be advantageous to provide an apparatus and method which allows for operation of electrodialysis or electrodeionization devices using lower voltages across the two electrodes and the consequent lowering of the voltage step for each cell compartment. It would also be beneficial to provide an electrodialysis device and method which reduces the energy consumption per unit volume of the product.

SUMMARY OF THE INVENTION

Accordingly, the present invention is based on the discovery that the efficiency of electrodialysis desalination systems can be improved if the concentrate compartment contents are pressurized with respect to the content of the diluate compartment. Further, this invention proposes that by creating constant volume concentrate compartments, the needed pressures to control flow of water from diluate compartments to concentrate compartments are created automatically without the need for pumps. Application of pressure to the concentrate compartment reduces and (in optimum conditions) eliminates osmotic and electro-osmotic water flow from diluate compartment to concentrate compartment. This will therefore improve the current efficiency of the system.

One aspect of the invention provides an electrodialysis device for use in improving the current efficiency of desalination of salty waters, the device comprising: (a) a plurality of ion exchange membranes for placement adjacent to one another within the device, each ion exchange membrane creating a concentrate compartment on one side and a diluate compartment on the other side when the device is filled with solution and acted upon by a direct current passing therethrough; (b) a plurality of spacers for placing between each of the plurality of ion exchange membranes, wherein the plurality of spacers create a constant volume compartment between adjacent ion exchange membranes; (c) a first electrode compartment and a second electrode compartment, each electrode compartment including an electrode; (d) a support structure for compressing and holding the electrode compartments, the spacers and the ion exchange membranes together, the support structure including passages for input lines and output lines; (e) a plurality of input lines for supplying solution to the diluate, concentrate and electrode compartments; (f) a plurality of output lines for removing solution from the diluate, concentrate and electrode compartments, wherein each of the input lines and output lines include valves that can be used to control the flow into and out of the device; and (g) a direct current electric power supply for establishing a potential difference between the two electrodes and thus causing the passage of electric current through the device. The spacers serve to create a constant volume compartment between adjacent ion exchange membranes when compressed by the support structure, thereby preventing volume change in the concentrate and diluate compartments.

Another aspect of the invention provides a method for improving the current efficiency of an electrodialysis desalination device, the method comprising pressurizing the solution within concentrate compartments, wherein the device comprises a plurality of ion exchange membranes and a plurality of spacers for placing between each of the plurality of ion exchange membranes, each ion exchange membrane creating a concentrate compartment on one side and a diluate compartment on the other side when the device is filled with solution and acted upon by a direct current passing therethrough.

The nature and advantages of the present invention will be more fully appreciated from the following drawings, detailed description and claims.

BRIEF DESCRIPTION OF THE DRAWINGS

The accompanying drawings illustrate embodiments of the invention and, together with a general description of the invention given above, and the detailed description given below, serve to explain the principles of the invention.

DETAILED DESCRIPTION OF THE INVENTION

The present invention improves the current efficiency of electrodialysis desalination systems (including systems for ion removal) and allows for operation of electrodialysis or electrodeionization devices using lower voltages across the two electrodes and the consequent lowering of the voltage step for each cell compartment. This, in effect, leads to a lowered voltage level used to move the ions and therefore reduces the energy consumption per unit volume of the product. By reduction of osmotic and electro-osmotic water transfer from the diluate to the concentrate compartments, overall production rate at a given voltage level (and energy per unit volume production) is also improved. The present invention also addresses the process and operational requirements and the equipment needed to optimally improve current efficiency.

It should be noted that osmotic and electro-osmotic flow of water from the diluate compartments to the concentrate compartments can have a detrimental effect on the electrical conductivity of the electrolytes in the electrode compartment of electrodialysis devices. This can lead to osmotic flow into the electrode compartments when these compartments act as concentrate compartments (as is usually the norm), and can dilute the electrode compartment solution, resulting in increased resistivity. Optimum operation of electrodes therefore requires careful monitoring and continuous changing of electrolytes in the electrode compartments, if energy loss by increased resistivity is to be avoided. So there is a need to stabilize the conductivity of the solutions in the electrode compartments. This invention therefore also details the process, equipment and procedures for control of osmotic and electro-osmotic flow to and from electrode compartments in electrodialysis equipment as means for maintaining optimum conductivity of the electrolyte in these compartments, and as a means of controlling and facilitating the flow of ions and, at the same time, saving energy. This last feature is also used to increase production rate.

Figure 1:
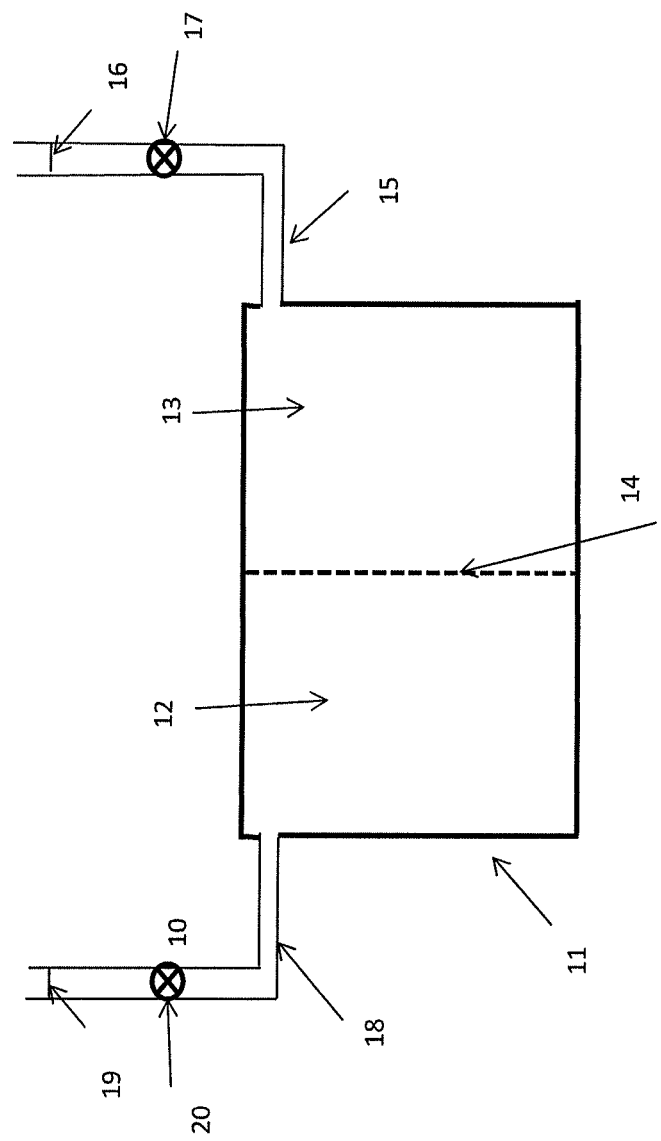
FIG. 1 is a schematic view of an experimental setup according to the invention which includes a rigid container divided into two compartments by a semi-permeable membrane.

To explain the fundamental concepts of this invention, attention is initially drawn to FIG. 1, in which an experimental setup 10 includes a rigid container 11 divided into two compartments 12 and 13 by a semi-permeable (i.e. ion exchange) membrane 14. Compartment 12 is filled with a relatively dilute salt solution and compartment 13 is filled with a more concentrated salt solution. The solution in compartment 13 is in fluid communication with rigid pipe 15 filled to level 16 above valve 17. The solution in compartment 12 is also in fluid communication with rigid pipe 18 filled to level 19 above valve 20. Levels 16 and 19 are at the same elevation; however, once this condition is established, with valves 17 and 20 open, it is observed that the water level 16 on the concentrate side gradually rises while the level 19 on the diluate side drops. This is due to the occurrence of osmotic flow leading to movement of water from the diluate side 12 to concentrated side 13. There will also be a minor bulging of the membrane towards the diluate side due to hydrostatic pressure difference developed.

Figure 2:
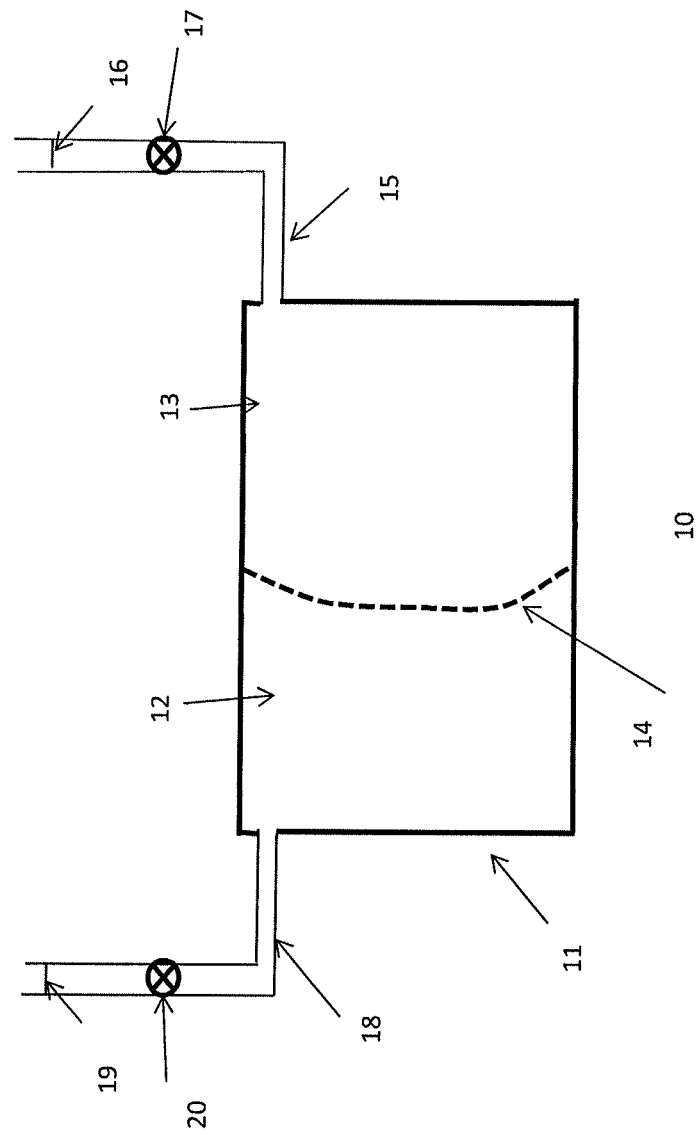
FIG. 2 is a schematic view of the experimental setup of FIG. 1 with valves closed.

FIG. 2 shows the same setup and the repeat of the same experiment with valves 17 and 20 closed. In this test it is observed that flow of water from diluate compartment 12 to concentrate compartment 13 will lead to pronounced bulging of the membrane 14 towards the diluate compartment. This indicates that with the constant total volume of container 11, the development of osmotic flow leads to decrease of volume of the diluate solution in compartment 12 and increase of volume of solution in compartment 13, as water moves from the diluate side to the concentrate side.

Figure 3:
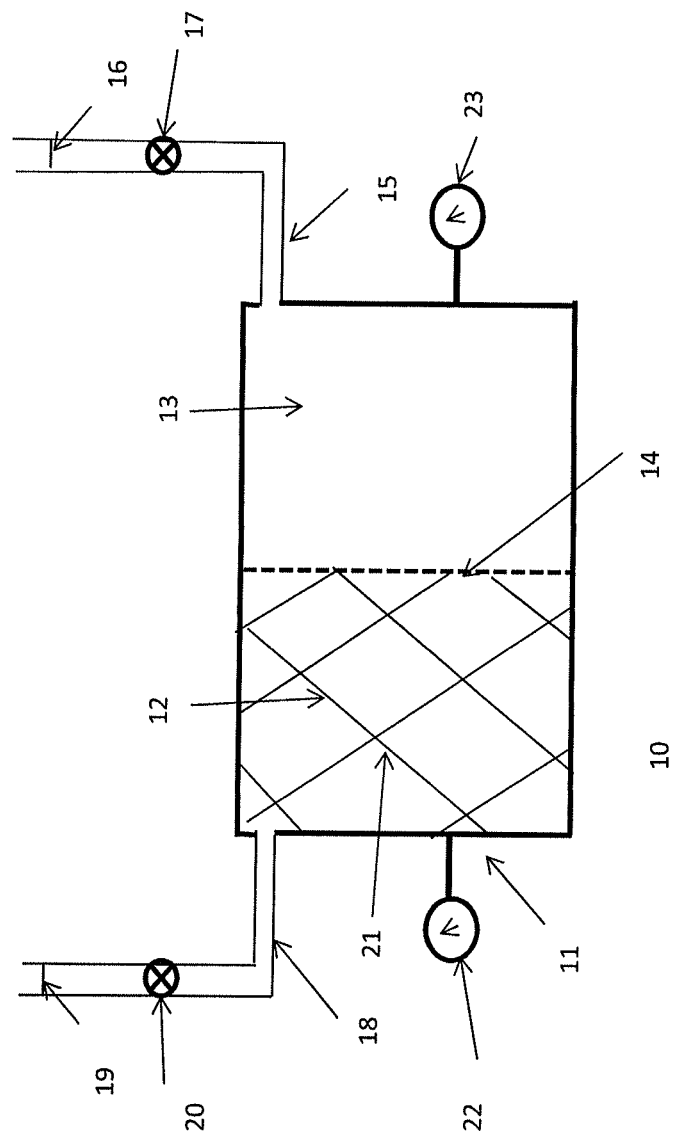
FIG. 3 is a schematic view of the experimental setup of FIGS. 1 and 2 with addition of a highly porous rigid structure placed in the diluate compartment, and pressure gages connected to the diluate and concentrate compartments.

FIG. 3 is the same as FIG. 1 with addition of a highly porous rigid structure 21 also placed in the diluate compartment 12. Structure 21 compressively supports membrane 14 and is considered to be very rigid. For example, structure 21 can be a porous stone as used in triaxial testing of soil samples to allow even distribution of water through the sample. If these two compartments are considered as a diluate and a concentrate compartment in a two cell electrodialysis setup with rigid sides, then support structure 21 can be a thin porous layer such as a plastic fabric mesh incorporated as a spacer completely filling the volume between two membranes. As illustrated in FIG. 3, two pressure gages 22 and 23 are connected to compartments 12 and 13 respectively. Again, if the diluate compartment 12 is filled with a more dilute salt solution and the concentrate compartment 13 is filled with a more concentrated salt solution, and the valves 17 and 20 are closed, there will be a tendency of osmotic flow of water from compartment 12 to compartment 13. In the setup of FIG. 3, this will lead to development of pressures that will register on pressure gages 22 and 23. The incompressibility of the water in compartment 13 will prevent any water from entering it, because any volume change in this compartment is fully resisted by the combination of membrane 14 and support structure 21, which will hold the volume of compartment 13 constant. As a result, the pressure in compartment 13 will rise to create a hydraulic pressure difference between solutions in compartments 13 and 12, while the pressure in compartment 12 will drop to zero gauge pressure. Under this condition if valve 20 on diluate compartment 12 is opened, pressure gauge 23 will still indicate the osmotic pressure difference and gauge 22 will indicate hydrostatic pressure which is the hydraulic head between the height of water level in pipe 18 and the height of gauge 22.

As the osmotic pressure developing across a semi-permeable membrane between two compartments with significantly different salt concentrations can be from several to more than 40 Bars, simple application of pressure to the concentrate input line and compartments in an electrodialysis stack although usable in reducing electro-osmotic and osmotic flow from the diluate into the concentrate compartment, can also lead to a number of negative issues, including damage to the membranes by tensile failure or bursting, blockage of diluate compartments by expanding concentrate compartments, and the need for high pressure pumps and the energy input required to raise the water pressure to the needed levels for relatively large concentrate flows.

Further, since electrodialysis devices typically use specific electrolytes in the electrode compartments to ease and facilitate electrode reactions and remove the generated gases, depending on sequencing of the ion exchange membranes, one or both electrode compartments might act as diluate compartments, resulting in the unwanted transfer of the constituents of the electrolytes used to the concentrate stream. There is also the issue of minimizing the electrical resistivity of the electrolytes in the electrode compartments that requires high conductivity achieved though high concentration of dissolved salts. This also results in high osmotic pressures, pushing water from adjacent diluate compartments, and to a lesser extent from the adjacent concentrate compartments, into the electrode compartment. Depending on the case, this can lead to loss of desalinated water and/or diluting of electrode compartment electrolytes. In any case, if the electrolytes in the electrode compartments are intentionally or unintentionally pressurized, the emission of gases from the metallic electrodes is also hampered, increasing the voltage drop and energy consumption at electrodes.

Based on the above, and with specific intention of improving and optimizing the current efficiency of electrodialysis systems through minimizing or elimination of osmotic and electro-osmotic flow, the present invention provides a system in which osmotic and electro-osmotic flow from diluate to concentrate compartments can, in addition to simple application of pressure to the fluids in the concentrate line, be reduced or stopped through a combination of the following measures:

Use of specific spacers between adjacent membranes that could reduce or eliminate any volume change in the diluate (intended and required) and concentrate compartments (as a matter of convenience and for use when the compartments switch roles) and also allow for easy flow of fluids in the compartments, and at the same time can effectively seal each of these compartments, even at high pressures. This feature provides for constant volume for each compartment and will structurally support the membranes to reduce their puncturing potential when pressurized from one side.

Intermittent and simultaneous closing of the input and output lines to the concentrate compartment—this prevents flow from the diluate to the concentrate compartment as a result of automatic hydrostatic pressure buildup in the concentrate compartments caused by the tendency of water to move into these constant volume compartments. In this manner, no pumps or their associated energy consumption will be needed to raise the pressure in the concentrate compartments. Here optimum results are achieved when upon opening of the input and the output valves to the concentrate compartments, the solution in these compartments is rapidly discharged and replaced with new, lower concentration feed. That is, once the pressure in the concentrate compartments is removed, osmotic water flow is immediately initiated. To reduce total volume of osmotic flow, rapid discharging of the concentrate fluid, followed by rapid filling and pressurization of the fluid in them, will reduce osmotic flow and improve the efficiency as well as the volume output of the products.

Use of high pressure, low capacity pumps—this will rapidly raise the pressure in the concentrate compartments after each valve's closure. The energy consumption for these pumps will be minimal as they do not need to move large volumes of water and only need to raise their pressure in relatively rigid constant volume concentrate compartments.

Use of high electric capacitance electrodes—for generation of the required electric fields. These types of electrodes do not require electrode reactions to generate electric fields. By the use of these electrodes as detailed in U.S. Pat. No. 8,715,477 to Yazdanbod (the inventor of the present invention), which is incorporated herein by reference in its entirety, the needed voltage reversals can be timed with valve operations and would also require switching the diluate and the concentrate compartments, when the direction of the electric field is reversed. Alternatively, double cell units, as disclosed in the above-referenced patent, can be used to avoid concentrate and diluate compartment switching.

Sequencing the ion exchange membranes in conjunction with the use of high capacitance electrodes—such that both of the electrode compartments act as concentrate compartments. In this case, the salinity of the solution adjacent to the electrodes can be maintained at a high value to minimize electric resistivity. Here, by the use of an independent input and output solution circuitry to the electrode compartments, the potentially higher pressures developing in these electrode compartments can be isolated from the rest of the concentrate compartments, if needed. Further, and depending on the strength of the membranes and spacers used, the higher pressures generated in these electrode compartments can be used to increase the pressure in the concentrate compartments resulting from combination of osmotic and electro-osmotic flows, allowing for some beneficial withdrawal of pure water by the reverse osmosis process from the concentrate to the diluate compartments.

Sequencing the ion exchange membranes for the cases where metallic electrodes are used—such that both of the electrode compartments are unpressurized diluate compartments, to allow for easy dissipation of the generated gases; or sequencing them such that they are both concentrate compartments where through the incorporation of an independent electrolyte input circuitry they can be in an unpressurized state. In this latter case, some osmotic and electro-osmotic transfer of water at the outer boundaries of the stacks will have to be tolerated.

Figure 4:
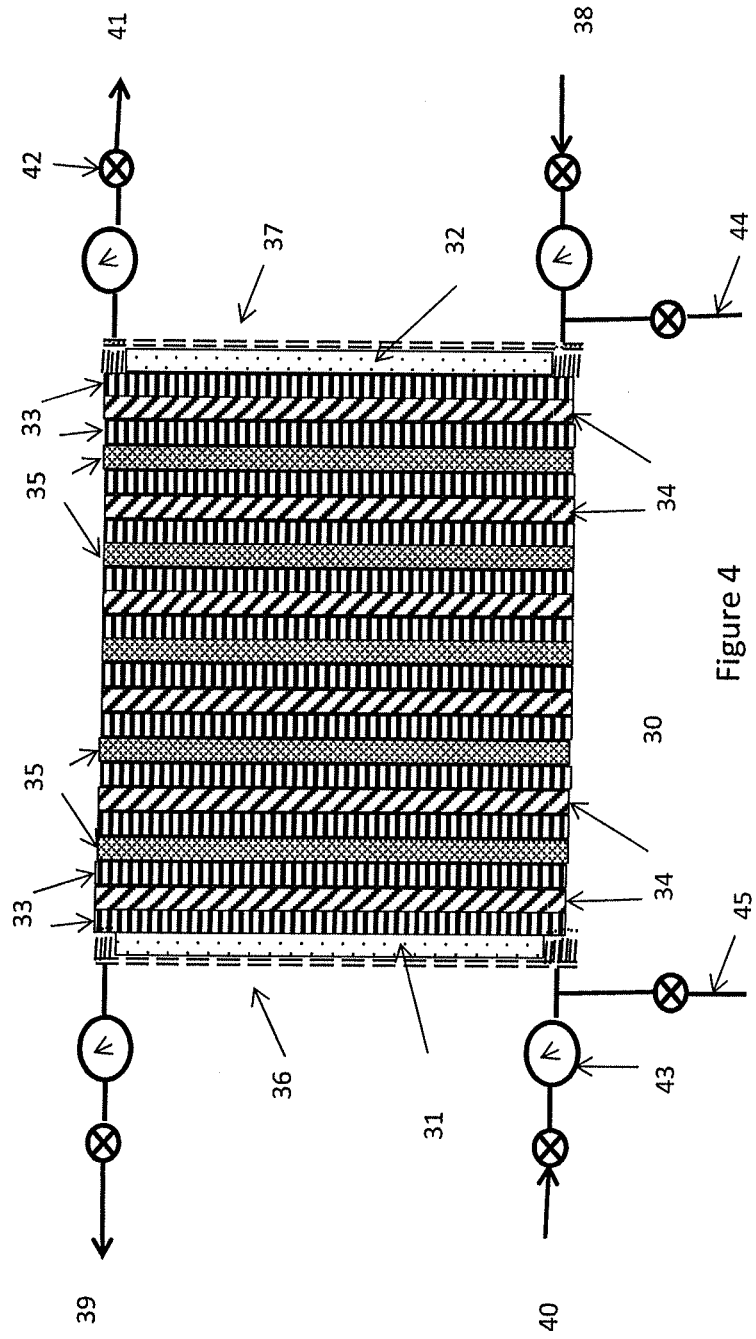
FIG. 4 is a schematic view of one embodiment of an electrodialysis cell according to the present invention.

FIG. 4 is a schematic representation of one embodiment of an electrodialysis cell 30 according to the present invention. In this figure, electrode compartments 31 and 32 can include high surface area, high capacitance electrodes (e.g. carbon aerogel composite electrodes) when the cell is a capacitive electrodialysis cell, or they can include conventional metallic electrodes as generally described herein and specifically illustrated in FIG. 5 and FIG. 6. The electrodes are positioned in a cavity within a support structure/frame, such as endplates 36 and 37. This support structure compresses and holds the electrode compartments 31, 32, the spacers 33, and the ion exchange membranes 34, 35 together, and includes passages for input lines and output lines. Here it is noted that the endplates 36 and 37 are made up of non-conductive materials such as plastics and could be supported by metallic support plates/frame (not shown) if and when needed. Cation exchange membranes 34 and anion exchange membranes 35 together with spacers 33 form the concentrate and the diluate compartments. Each ion exchange membrane creates a concentrate compartment on one side and a diluate compartment on the other side when the device is filled with solution and acted upon by a direct current passing therethrough. Spacers 33 are placed between cation 34 and anion 35 exchange membranes to create a constant volume compartment between adjacent ion exchange membranes, and are also placed adjacent to electrode compartments 31 and 32.

The spacers 33 typically have two distinct parts, (1) a central part and (2) a gasket. The central part is used to create space between membranes 34 and 35, and to direct the flow of water between the entry and exit points incorporated on the second part, the gasket. The central parts of these spacers are typically made of plastic (usually in the form of a wire mesh) and have a minimal compressibility in the planar direction. Therefore, the material of construction and structure of the central parts of the spacers 33 create such dimensions, thickness and low compressibility as to render a relatively constant volume when compressed by high pressures imposed on the outer facings of the membranes placed adjacent to them. The central parts of these spacers also act as structural support for the membranes to improve their rupture/puncture resistance under pressure. The spacers 33 are also equipped with gaskets, which when compressed can completely seal the volume between two adjacent membranes. These gaskets also have passages for input solutions such that the input solutions are directed through specific flow channels positioned in the supporting frame and structure of the device, that in combination with flow passages in the spacers cause the independent flows in the concentrate and diluate compartments, as is known in the art.

The thickness and the construction material of each of the gaskets should be such that, when compressed to seal the compartment, the thickness of each is substantially equal to the thickness of its central part. This construction of spacer is intended to be such that when installed between two membranes and compressed, a sealed constant volume compartment between the membranes results. The entire assembly of ion exchange membranes 34, 35, the spacers 33 and the electrode compartments 31, 32 are held together and are compressed through support endplates 36 and 37, which include the passages required for input lines supplying the input solutions to concentrate and diluate compartments, and exit or output lines for concentrate reject waters and the desalinated product waters. The support endplates 36 and 37 also create and house the electrodes/electrode compartments 31 and 32.

When the electrodes are metallic, or when it is desired to control the flow and the pressure in the vicinity of capacitive electrodes independent of the diluate or concentrate compartments, the support endplates also include passages to independently supply the electrolytes needed to the vicinity of the electrodes and allow for exit and/or recirculation of these fluids and the generated gases (for metallic electrodes) at the electrode facings (not shown). The supporting endplates 36, 37 are also equipped with means, such as bolts (not shown), as is known in the art, to hold the entire assembly 30 together, i.e. to compress the membranes 34, 35, the spacers 33 and the electrode compartments 31, 32 together. Alternatively, a separate frame could be used to support and compress the stack and all its aforementioned parts, as noted earlier. Further, the support structure/frame, such as support endplates 36, 37, includes internal fluid passages (not shown) to allow for independent input of water to the diluate, concentrate and electrode compartments, as is known in the art. External input lines 38, 40 and exit or output lines 39, 41, 44, 45 to the cell are shown on FIG. 4. Input line 38 supplies the diluate compartments, and output line 39 is a continuous operation output line, providing the product (desalinated water) in a continuous flow operation, while output line 44 is used for batch output. Here batch operation is defined as filling the compartments and closing all valves, followed by establishment of the electric filed, in turn followed by extraction of the contents of the compartments after sufficient transfer of ions is achieved. In this mode of operation, variations in terms of extracting the contents of diluate or concentrate together or separately could be envisaged. Similarly, input line 40 is the input line to the concentrate compartments and output lines 41 and 45 will be continuous operation and batch operation reject water output lines, respectively. Each of the input lines 38, 40 and output lines 39, 41, 44, 45 are also equipped with valves 42 that can be used to control the flow into and out of the device, and to isolate the fluids in the diluate or the concentrate compartments from input and output fluid circuits.

To speed up the output flow in batch operations, the continuous operation output line 39 can be used as a compressed air input line. Under this condition, when the valves 42 of output lines 39 and 44 are open and the valve of input line 38 is closed, supplying compressed air to line 39 will result in speedy withdrawal of diluted solution. When both the input line valves and the output line valves 42 to the diluate or the concentrate compartments as shown on FIG. 4 are closed, the volume of fluid in each of them is held constant due to incompressibility of the spacers, unless there is flow through the membranes. To enable the measurement of pressures in the input and output lines and in the concentrate and diluate compartments connected to them, pressure measurement devices 43 (such as pressure gauges or pressure transducers) are also placed between the valves 42 and the device 30, as shown in FIG. 4.

Figure 5:
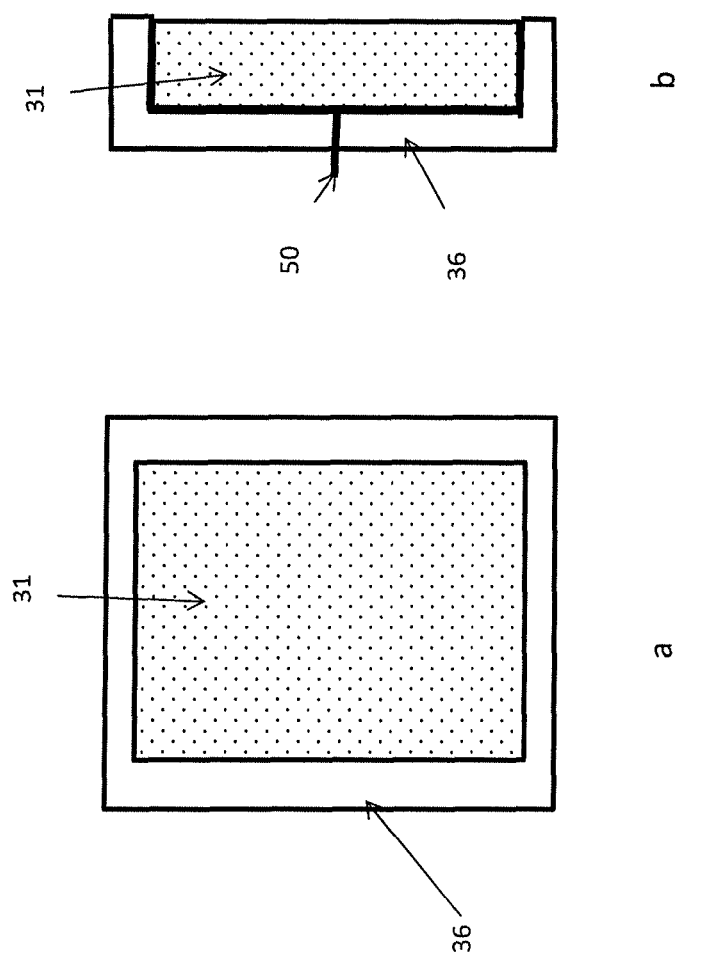
FIG. 5 is a schematic view of a supporting endplate and a capacitive electrode housed in it in frontal view (a) and side view (b).
Figure 6:
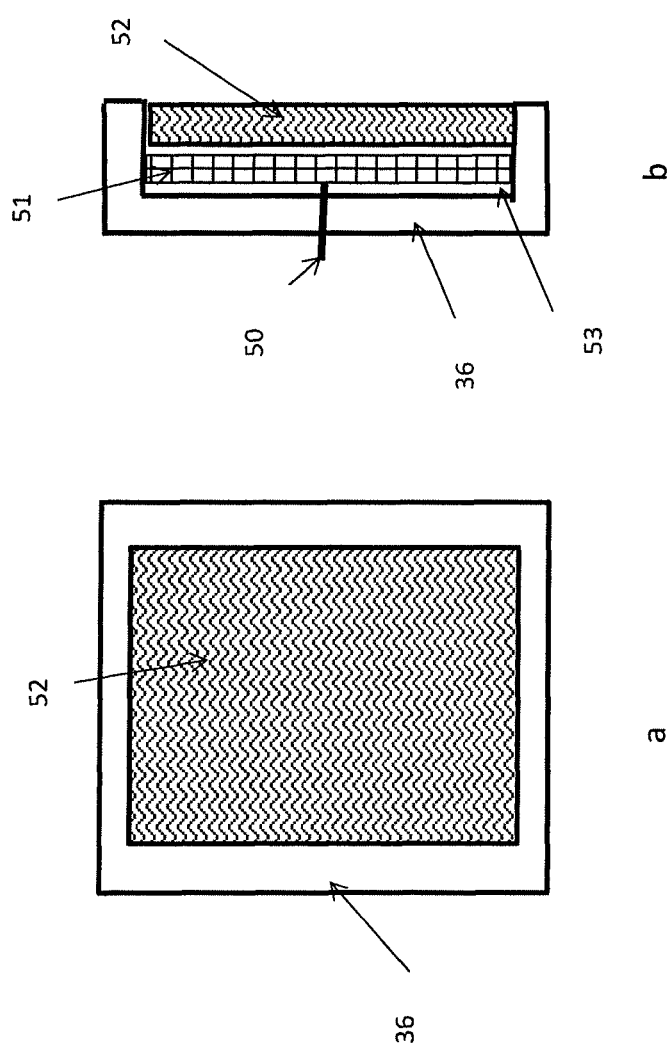
FIG. 6 is a schematic view of a supporting endplate and a metallic electrode having a porous, incompressible, and highly permeable cover housed therein, in frontal view (a) and side view (b).

Electrode compartments 31, 32 within the support endplates 36 and 37 in FIG. 4 can house a capacitive electrode as shown in FIG. 5, or a metallic electrode as shown in FIG. 6, for one side of the assembly 30. FIG. 5 represents a supporting endplate 36 and a capacitive electrode 31 housed in it in frontal view (a) and side view (b), in which it can be appreciated that the capacitive electrode 31 is equipped with an electrical connection 50 to the outside (not shown in FIG. 4). As is well known in the art, a direct current electric power supply establishes a potential difference between the two electrodes and thus causes the passage of electric current through the device. The electric power supply and connection lines for connection 50 are not shown. The outer surface of the capacitive electrode 31 is flush with the edges of the support endplate 36, such that when the bolts penetrating though the endplates or clamps (not shown) are tightened to compress the entire assembly 30 of FIG. 4, the spacer 33 placed adjacent to the electrode/electrode compartment 31 will be flush with the membrane 34 on its other side and will be able to support it without any volume change of the compartment formed by this spacer 33. The spacers serve to create a constant volume compartment between adjacent ion exchange membranes when compressed by the support structure, thereby preventing volume change in the concentrate and diluate compartments.

FIG. 6 represents a supporting endplate 36 and a metallic electrode/electrode compartment 51 having a porous, incompressible, and highly permeable cover 52 housed therein, in frontal view (a) and side view (b), in which it can be appreciated that the metallic electrode 51 is equipped with an electrical connection 50 to the outside. In order to provide structural support for the spacer 33 and sufficient volume for the electrolyte 53 needed in the space adjacent to the metallic electrode 51, a porous structural element 52 (e.g. porous stones as used in triaxial testing of soil samples to allow even distribution of water through the sample) is positioned in front of the metallic electrode 51. The outer surface of this porous structural element 52, which is made up of porous electrically non-conducting material, is flush with the edges of the support endplate 36, such that when the bolts penetrating though the endplates or clamps (not shown) are tightened to compress the entire assembly 30 of FIG. 4, the incompressible spacer 33 placed adjacent to the porous structural element 52 will be flush with the ion exchange membrane 34 adjacent to it. In this manner, the membrane 34 and the adjacent spacer 33 (see FIG. 4) will help seal the compartment formed between them and the cavity in the support endplate 36 containing the porous structural element, the electrolyte 53 and electrode 51. Once again it is noted that sealing of all compartments in device 30 is accomplished through the gaskets at the edges of spacers 33.

With a view to FIGS. 4 and 5, when the device 30 is equipped with capacitive electrodes 31, 32 and filled with a saltwater solution, and with all valves 42 being closed and a DC potential then being applied between the two electrodes 31, 32, the established electric field between the electrodes will move the positive ions in the direction of the electric field and the negative ions in the opposite direction. The interaction of these moving ions with the ion selective membranes will then result in gradual accumulation of these ions in the concentrate compartments and their gradual removal from the diluate compartments. The rate of ion movement is the same as the generated electric current. Ions moving through the ion selective membranes cause some electro-osmotic flow from diluate compartments to concentrate compartments. Further, as the concentrations of the electrolyte solutions on each side of each membrane change, a differential osmotic pressure is gradually created across each membrane, tending to cause further movement of water molecules from the diluate compartments to the concentrate compartments. With all valves 42 closed, this tendency of water movement will result in development of osmotic pressure differentials between the two solutions on the two sides of each membrane. This will reduce, and in ideal conditions stop, osmotic flow between the concentrate and diluate compartments. In addition, and depending on the extent of the pressures developed, the electro-osmotic flow is also reduced and in ideal conditions stopped. Experimental results as presented herein confirm these conclusions.

Current efficiency of electrodialysis systems is typically defined as the ratio of the ions removed from each diluate output to the total charge passed through the stack and between the electrodes. This is a measure of how effectively ions are transported across the ion exchange membranes for a given applied current. Typically current efficiencies >80% are desirable in commercial operations to minimize energy operating costs. In a batch operation as defined above, salinity changes in the diluate output extracted from a device as compared to the salinity of the input solution can be used to calculate the charges removed from each compartment and can then be used in conjunction with the total charge passed to calculate the efficiency. Similar procedures can also be used to calculate the efficiency of charge removal to the concentrate. The same can be done for continuous operations in which the salinity change in diluate and concentrate flow as compared to input solutions can be used to calculate the current efficiency.

Tests

Test 1; in this test the setup (and in all tests herein) as presented in FIG. 4 was used. The electrodes 31, 32 were standard metallic electrodes. An input solution with 3.5% salt content was supplied to the device through input lines 38 and 40. After de-airing the device through exit lines 39 and 41 and confirming that there were no leaks between the diluate and the concentrate compartments using the recommended procedure by the equipment manufacturer as described in the Equipment and Material section of this document, the fluid level in input lines 38 and 40 extending upward were brought to the same level, some 60 centimeters above the top of the device. The tubing for input lines 38 and 40 in this test extended to 1.5 meters above the top of the device 30, and their valves 42 were open. Valves for output lines 39 and 41 were closed. At the time of this test, output lines 44 and 45 had not been added to the test setup, but if present would be closed as well. For this experiment twenty-five (25) anion exchange membranes and twenty-five (25) cation exchange membranes were used. Upon application of 2.5 Volts of potential difference between the electrodes, and within a time of about 600 seconds and an average current of about 600 mA, it was observed that water level in 8 mm ID line 40 connected to the concentrate compartments had raised to the top of the pipe at 1.5 meters above the top of the device, while no water was observed in the 8 mm ID line 38 connected to the diluate compartments indicating that the contents of this line were drawn into the diluate compartments. This test showed that with the use of metallic electrodes and without manipulation of pressures, osmotic and electro-osmotic water flow from the diluate to the concentrate compartments occur.

Test 2: This test was very similar to test 1. In this test the input solutions had a conductivity of 37.7 mS/cm and seven (7) pairs of ion exchange membranes were used. This setup used capacitive electrodes, as presented in FIG. 7 and described in the Equipment and Material section of this document. Input water levels through lines 38 and 40 were initially about thirty centimeters (30 cm) above the top of the device 30. In this test, and using a voltage of 2.5 Volts between the electrodes and within a period of 1500 seconds, the water level in the line 40 connected to the concentrate compartments rose by forty-four centimeters (44 cm), and dropped by the same amount (14 cm) in the line 38 connected to the diluate compartments. At the end of the test the valves 42 for input lines 38 and 40 were closed and the content of diluate and concentrate compartments were extracted using air flow through lines 39 and 41, with the solutions coming out of lines 44 and 45 with their valves now opened. The input solution had a conductivity of 37.5 mS/cm and the diluate and concentrate compartment solutions had conductivities of 30.1 mS/cm and 42.4 mS/cm respectively. Diluate volume and concentrate volumes were 49 ml and 53 ml respectively. Comparison of ion transfer with total charge supplied has yielded a current efficiency of 19.4% for the diluate solution, and 12.8% for the concentrate solution. This test also confirmed electro-osmotic and osmotic water transfer from the diluate to the concentrate compartments.

Test 3: This test was very similar to test 2 with the difference being that after filling and de-airing the device as described immediately above, all valves 42 on the input lines 38, 40 and output lines 39, 41, 44, 45 were closed. The developed pressure was recorded using pressure gauges 43 on input lines 38 and 40. In this test it was observed that within a short time the pressure gage installed on the input line 38 to the diluate compartments dropped to zero gauge pressure, while within a period of 1115 seconds the pressure on the input line 40 to the concentrate compartments rose to thirty (30) psi, which was the maximum allowed for the pressure gauge used. Extracted dilute and concentrated contents of the device using air flow as before yielded about 65 ml of concentrate with a conductivity of 42.4 mS/cm. The dilute solution was about 40 ml and had a conductivity of 30.2 mS/cm. The calculated dilute and concentrated current efficiencies were 24.3% and 22.3%, respectively. This test not only demonstrated the development of pressure within the concentrate compartments as result of osmotic and electro-osmotic flow tendencies, but also showed that when the volumes of the diluate and concentrate compartments are not held constant, the developed pressures reduce the volume of the diluate compartments and increase the volume of the concentrate compartments. Even so, the series of tests represented here under "test 3" clearly show that upon allowing for mobilization of osmotic and electro-osmotic pressures in the concentrate compartments, current efficiency improves.

Test 4: This test was very similar to test 3 with the difference that instead of 2.5 Volts, a voltage of 4.0 Volts was applied between the electrodes. In this test it was observed that the maximum pressure of the gauge measuring the developed pressure in the concentrate compartment (30 psi) was reached in 750 seconds instead of 1115 seconds in test 3. In this test the extracted diluate and concentrate compartment contents using air flow as before yielded about 68 ml of concentrate solution with a conductivity of 43.5 mS/cm. The diluate solution was about 40 ml and had a conductivity of 28.6 mS/cm. The calculated diluate and concentrate current efficiencies were 28.0% and 32.1% respectively.

This test, while confirming the observations of test 3, also showed that with higher voltage the process of desalination and development of pressures occur faster.

Test 5: This test was very similar to test 3 with the difference that before application of the 2.5 Volts potential difference between the electrodes, the pressure of the concentrate compartments was raised to 20 psi and was held constant during the test. As the pressure was being applied to the concentrate compartments, it was noted that the pressure in the diluate compartments also rose to about 6 psi. This test was continued for 500 seconds and it was observed that the pressure in the diluate compartments reached zero gauge pressure within 265 seconds. In this test, the extracted diluate and concentrate compartment contents using air flow as before yielded about 75 ml of concentrate with a conductivity of 42.8 mS/cm. The dilute solution was about 40 ml and had a conductivity of 28.2 mS/cm. The calculated diluate and concentrate current efficiencies were 43.1% and 45.4% respectively. This test results clearly show that by application of pressure to concentrate compartments, current efficiency improves.

Test 6: This test was very similar to test 5, with the difference that after initial application of 20 psi pressure to the concentrate compartments, the valve 42 to this input line 40 was also closed and the pressure in these compartments was allowed to rise. In this test the maximum allowed pressure of the gauge used (30 psi) was reached in 265 seconds while at the same time the developed pressure in the diluate compartments dropped from an initial value of 4.2 psi to 1.1 psi. In this test the extracted diluate and concentrate compartment contents using air flow as before yielded about 70 ml of concentrate with a conductivity of 42.6 mS/cm. The diluate solution was about 48 ml and had a conductivity of 30.3 mS/cm. The calculated dilute and concentrated current efficiencies were 61.8% and 62.0% respectively. The results of this test clearly show that current efficiency improves by application of pressure to the concentrate compartments, and this efficiency is aided by allowing pressure to rise in response to development of osmotic and electro-osmotic flows.

Equipment and Material

Figure 7:
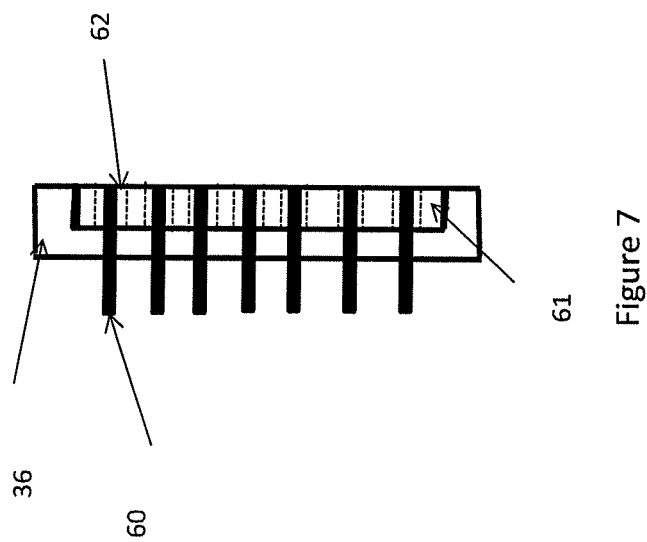
FIG. 7 is a schematic view of high capacitance aerogel composite electrodes in the form of rods penetrating through holes in support structure polypropylene endplates.

Electrodialysis equipment used in the tests presented above are the ED200 electrodialysis stack supplied by PCCell GmbH from Germany with the related anion and cation exchange membranes and spacers. This device usually can accommodate up to 100 membranes, each with an effective area of 207 cm2. The spacers are polyethylene mesh with silicon edges with edge thickness of about 0.35 mm and center mesh thickness of 0.25 mm. The standard equipment is supplied with anode made up of titanium with Pt/Ir coating and the cathode is stainless steel. This device has been used in its standard form and with replacement of the electrodes with high capacitance aerogel composite electrodes as schematically shown in FIG. 7. In FIG. 7, the aerogel composite electrodes 60 were in the form of 15 mm diameter rods penetrating through 18 mm diameter holes 62 into the support polypropylene endplates for a distance of 16 mm and were sealed for a distance of 10 mm. To laterally support the spacers and membranes placed adjacent to these endplates, the volume of endplate electrode cavity was filled with rigid plastic sheeting 61 that also included holes 62. The endplates were 150 mm by 300 mm by 30 mm thick. The electrode cavities in these endplates were 218 mm by 95 mm by 4 mm deep. The electrodes were installed flush with the edge of the endplates and created an exposed length of 20 mm contacting the fluids adjacent to them. Eighteen such electrodes were used in each endplate. The composition and manufacturing procedure for these electrodes is detailed in U.S. Pat. No. 8,715,477 to Yazdanbod (the inventor of the present invention), which is incorporated herein by reference in its entirety. These endplates are equipped with passages for independent input and output to the diluate and concentrate compartments and for independent input and output of electrolytes to the electrode cavities. The electric connections between the individual electrodes and power supply device are not shown, as their use is well known in the art.

The electrodialysis equipment in FIG. 4 was connected to four separate saltwater supply transparent plastic tubes, each connected to its own plastic saltwater container at a height of about 80 cm above the top of the electrodialysis device. Two tubes supplied the saltwater to electrode cavities and two supplied the input lines 38, 40 to the diluate and concentrate compartments, respectively. Output lines 39, 41, 44 and 45 to the concentrate and diluate compartments were open to air. Connecting lines to and from electrode compartments are not shown on FIG. 4. All input and output lines were equipped with plastic high pressure valves 42 and connections. Input lines 38, 40 to the diluate and concentrate compartments were also equipped with pressure measurement gauges 43. When needed, each input tube can be replaced with a different tube connected to a partially filled, pressurized saltwater container in turn connected to a hand operated air pump. This alternative connection can supply the input water with pressures as high as 60 psi.

In every test, and in order to insure that there were no leaks between the diluate and the concentrate compartments, the procedures recommended by the equipment manufacturer were followed. In such procedures, after de-airing the equipment, the valve 42 on the input line 40 to the concentrate compartments was opened to the constant head supply water container, while the valves 42 on lines 38 and 44 to the diluate compartments and on the output lines 45 and 41 of the concentrate compartments were closed. If no flow or very little water flow (i.e. less than 0.5 ml per minute) coming out of the output line 39 to the diluate compartment was observed, the equipment was considered as sealed.

The power supply used is a REF 3000 Gamry Instruments potentiostat capable of supplying DC voltage and simultaneous recording of voltage and current. The software installed for this device yields the total charge transferred between electrodes by integration of the current-time curve while instantaneously showing voltages and currents in real time. Salinity of the input and output solutions were measured using a Pinpoint® Salinity Monitor EC meter manufactured by American Marine Inc. This device has a nominal range of 0.00 to 200 mS/cm.

While the present invention has been illustrated by the description of embodiments and examples thereof, it is not intended to restrict or in any way limit the scope of the appended claims to such detail. Additional advantages and modifications will be readily apparent to those skilled in the art. Accordingly, departures may be made from such details without departing from the scope of the invention.

What is claimed is:

1. An electrodialysis device for use in improving the current efficiency of desalination of salty waters, the device comprising:
   a) a plurality of ion exchange membranes for placement adjacent to one another within the device, each ion exchange membrane creating a concentrate compartment on one side and a diluate compartment on the other side when the device is filled with solution and acted upon by a direct current passing therethrough;

b) a plurality of spacers for compressing between and structurally supporting each of the plurality of ion exchange membranes, each of the plurality of spacers comprising a single piece construction completely filling the volume between adjacent ion exchange membranes and including a central portion and a gasket, each central portion having minimal compressibility in the planar direction for structurally supporting the ion exchange membranes when compressed, each gasket adapted to seal the volume between adjacent ion exchange membranes when compressed, wherein compression of the spacers creates a sealed constant volume compartment between adjacent ion exchange membranes, thereby preventing volume change in the concentrate and the diluate compartments;

c) a first electrode compartment and a second electrode compartment, each electrode compartment including an electrode;

d) a support structure for compressing and holding the electrode compartments, the spacers and the ion exchange membranes together, the support structure including passages for input lines and output lines, wherein compression of the spacers by the support structure creates the sealed constant volume compartments between adjacent ion exchange membranes;

e) a plurality of input lines for supplying solution to the diluate, concentrate and electrode compartments;

f) a plurality of output lines for removing solution from the diluate, concentrate and electrode compartments, wherein each of the input lines and output lines include a valve for controlling the flow into and out of the diluate, concentrate and electrode compartments; and g) a direct current electric power supply for establishing a potential difference between the two electrodes and thus causing the passage of electric current through the device when the device is filled with solution, wherein simultaneous closing of the valves for the input and output lines to the concentrate compartments causes automatic hydrostatic pressure buildup in the concentrate compartments and reduced flow from the diluate compartments to the concentrate compartments during passage of direct current through the device, thereby improving current efficiency.

2. The electrodialysis device of claim 1, wherein each of the spacers include a central part and a gasket, each gasket including passages for transporting input solutions and adapted to be compressed to completely seal the volume between two adjacent ion exchange membranes, each central part adapted to direct the flow of water between the gasket passages and having minimal compressibility in the planar direction.

3. The device of claim 1, wherein the electrodes are selected from the group consisting of metallic electrodes and capacitive electrodes.

4. The device of claim 3, wherein the electrodes are metallic electrodes and the electrode compartments include a porous, incompressible, and highly permeable cover.

5. A method for improving the current efficiency of an electrodialysis desalination device, the device comprising:
(a) a plurality of ion exchange membranes placed adjacent to one another, each ion exchange membrane creating a concentrate compartment on one side and a diluate compartment on the other side when the device is filled with solution and acted upon by a direct current passing therethrough; (b) a plurality of spacers for compressing between and structurally supporting each of the plurality of ion exchange membranes, each of the plurality of spacers comprising a single piece construction completely filling the volume between adjacent ion exchange membranes and including a central portion and a gasket, each central portion having minimal compressibility in the planar direction for structurally supporting the ion exchange membranes when compressed, each gasket adapted to seal the volume between adjacent ion exchange membranes when compressed, wherein compression of the spacers creates a sealed constant volume compartment between adjacent ion exchange membranes, thereby preventing volume change in the concentrate and the diluate compartments; (c) a first electrode compartment and a second electrode compartment, each electrode compartment including an electrode; (d) a support structure for compressing and holding the spacers and the ion exchange membranes together, wherein compression of the spacers by the support structure creates the sealed constant volume compartments between adjacent ion exchange membranes; (e) a plurality of input lines and output lines for supplying and removing solution from the diluate compartments and the concentrate compartments, wherein each of the input lines and output lines include a valve for controlling the flow into and out of the diluate compartments and the concentrate compartments; and (f) a direct current electric power supply for establishing potential difference between the two electrodes and thus causing the passage of electric current through the device when the device is filled with solution, the method comprising the steps of:
i) closing of the valve for the input line of the concentrate compartments; and
ii) simultaneously closing the valve for the output line of the concentrate compartments to cause automatic hydrostatic pressure buildup in the concentrate compartments and reduced flow from the diluate compartments to the concentrate compartments during passage of direct current through the device, thereby improving current efficiency.

6. The method of claim 5, further comprising the step of pressurizing each of the sealed constant volume compartments with low capacity high pressure pumps to expedite pressure buildup prior to closing of the valves for the input and output lines of the concentrate compartments.

7. An electrodialysis device for use in improving the current efficiency of desalination of salty waters, the device comprising:
a) a plurality of ion exchange membranes, each ion exchange membrane creating a concentrate compartment on one side and a diluate compartment on the other side when the device is filled with solution and acted upon by a direct current passing therethrough;
b) a plurality of spacers for placing between each of the plurality of ion exchange membranes, each of the plurality of spacers comprising a single piece construction completely filling the volume between adjacent ion exchange membranes and including a central portion and a gasket, each central portion having minimal compressibility in the planar direction for structurally supporting the ion exchange membranes when compressed, each gasket adapted to seal the volume between adjacent ion exchange membranes when compressed, each of the plurality of spacers adapted to create a seal between adjacent ion exchange membranes;
c) a support structure for compressing and holding the spacers and the ion exchange membranes together, wherein compression of the spacers by the support structure creates constant volume compartments between adjacent ion exchange membranes, thereby preventing volume change in the concentrate compartments and the diluate compartments;

d) a plurality of input lines and output lines for supplying and removing solution from the diluate compartments and the concentrate compartments; and e) a plurality of valves for controlling the flow into and out of the diluate compartments and the concentrate compartments, wherein simultaneous closing of the valve for the input line to the concentrate compartments and the valve for the output line from the concentrate compartments causes automatic hydrostatic pressure buildup in the concentrate compartments and reduced flow from the diluate compartments to the concentrate compartments during passage of direct current through the device, thereby improving current efficiency.

8. The device of claim 7, further comprising a high pressure, low capacity pump for use in expediting pressure buildup in the concentrate compartments prior to simultaneous closure of the valves for the input and output lines of the concentrate compartments.

9. The device of claim 7, the device further comprising a first electrode compartment housing a first electrode and a second electrode compartment housing a second electrode, wherein the support structure compresses and holds the electrode compartments, the spacers and the ion exchange membranes together, and wherein the plurality of input lines and output lines supply and remove solution from the electrode compartments, the diluate compartments and the concentrate compartments.

10. The device of claim 9, wherein the ion exchange membranes are sequenced such that both of the electrode compartments act as concentrate compartments to maintain high conductivity of the solution adjacent to the electrodes.

11. The device of claim 9, further comprising a high pressure, low capacity pump for use in pressurizing each of the electrode compartments, thereby preventing reduced concentration of the solution in the electrode compartments.

12. The device of claim 9, wherein the electrodes are selected from the group consisting of metallic electrodes and capacitive electrodes.

13. The device of claim 12, wherein the electrodes are metallic electrodes and the electrode compartments include a porous, incompressible, and highly permeable cover.

14. The device of claim 12, wherein the electrodes are capacitive electrodes completely filling the electrode compartments.

15. The device of claim 12, wherein the electrodes are metallic and the ion exchange membranes are sequenced such that both electrode compartments act as diluate compartments, the electrode compartments thereby being unpressurized to facilitate easy dissipation of generated gases.

* * * * *